(12) United States Patent
Nakazato et al.

(10) Patent No.: US 8,243,063 B2
(45) Date of Patent: Aug. 14, 2012

(54) SHAPE INSPECTION APPARATUS, SHAPE INSPECTION METHOD AND COMPUTER READABLE MEDIUM

(75) Inventors: Hiroaki Nakazato, Kanagawa (JP); Masaaki Hagiwara, Kanagawa (JP); Toshihiro Numauchi, Kanagawa (JP); Katsumi Takezaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 877 days.

(21) Appl. No.: 12/271,347

(22) Filed: Nov. 14, 2008

(65) Prior Publication Data

US 2009/0129662 A1 May 21, 2009

(30) Foreign Application Priority Data

Nov. 15, 2007 (JP) ................ P2007-296350

(51) Int. Cl.
*G06T 15/00* (2011.01)
(52) U.S. Cl. ....................... 345/419; 700/204
(58) Field of Classification Search .......... 345/419; 700/204
See application file for complete search history.

(56) References Cited

U.S. PATENT DOCUMENTS

| | | | |
|---|---|---|---|
| 6,338,000 B1 * | 1/2002 | Nakajima et al. | 700/97 |
| 2003/0055521 A1 | 3/2003 | Fuki et al. | 700/98 |
| 2008/0052036 A1 * | 2/2008 | Shimizu | 702/156 |

FOREIGN PATENT DOCUMENTS

| | | |
|---|---|---|
| JP | 7-60495 A | 3/1995 |
| JP | 9-147144 A | 6/1997 |
| JP | 11-147226 A | 6/1999 |
| JP | 2003-99482 A | 4/2003 |
| JP | 2004-38502 A | 2/2004 |
| JP | 2005-271816 A | 10/2005 |
| JP | 2005-275596 | 10/2005 |
| JP | 2007-193443 | 8/2007 |

OTHER PUBLICATIONS

Koura et al. "Geometric Dimension and Tolerance Modelling and Validation System Based on Object Oriented Paradigm for 3D Solid Model", Proceedings of Insert Conference Abbreviation: IMECE2004 2004 ASME International Mechanical Engineering Congress, Nov. 13-19, 2004, pp. 4-6.*

* cited by examiner

*Primary Examiner* — Maurice L McDowell, Jr.
(74) *Attorney, Agent, or Firm* — Morgan, Lewis & Bockius LLP

(57) ABSTRACT

A shape inspection apparatus includes a shape display unit that displays a three-dimensional shape specified by three dimensional shape data on a screen; a direction designating unit that specifies a drawing direction in molding the three-dimensional shape on the screen; a face designating unit that specifies one face of a protruding or recessed shape portion of the three-dimensional shape on the screen; a dimension calculating unit that calculates a shape dimensional value of the shape portion based on the specified drawing direction and the specified one face; and a determination unit that determines whether or not the shape portion having the shape dimensional value satisfies a shape condition by comparing the calculated shape dimensional value with a standard value.

6 Claims, 12 Drawing Sheets

FIG. 13

```
┌─────────────────────────────────────────────┐
│ MESSAGE                                     │
├─────────────────────────────────────────────┤
│                                             │
│  (i)   <<COM-CH-013 RIB check>>             │
│                                             │
│    Model to be checked: Product model       │
│    Drawing gradient base: Tip               │
│    Number: x3                               │
│                                             │
│    ************ [ Check of tip width of RIB ] ************
│    ◎ OK!!!                                  │
│    Check result: 1.0mm                      │
│                                             │
│    *Standard value: 1.0mm or more           │
│                                             │
│    ************ [ Check of bottom width of RIB ] **********
│    ◎ OK!!!                                  │
│    Check result: 1.18mm                     │
│                                             │
│    *Standard value: Bottom wall thickness 1.20mm
│    (60% of 2.00mm) or less                  │
│                                             │
│    ************ [ Check of height of RIB ] ************
│    ◎ OK!!!                                  │
│    Check result: 10.11mm                    │
│    *Standard value: 15mm or less for RIB tip width 1.00mm
│                                             │
│    ************ [ Check of gradient of RIB ] ***********
│    Excluding target to be checked           │
│                                             │
│                    ┌──────┐                 │
│                    │  OK  │                 │
│                    └──────┘                 │
└─────────────────────────────────────────────┘
```

FIG. 14

| No. | To be checked | Gradient direction | Drawing direction | Overall result | [RIB tip width] Standard value (1mm) or more | | | [RIB bottom width] Result of RIB bottom width | |
|---|---|---|---|---|---|---|---|---|---|
| | | | | | Calculated value | Result | Standard value | Result | Calculated value |
| 1 | Product | Tip | -z | OK | 1.00mm | OK | 1.00mm | OK | 1.18mm |
| 2 | Product | Tip | -z | OK | 1.00mm | OK | 1.00mm | OK | 1.18mm |
| 3 | Product | Tip | -z | OK | 1.00mm | OK | 1.00mm | OK | 1.18mm |
| 4 | Product | Tip | -z | OK | 1.00mm | OK | 1.00mm | OK | 1.18mm |
| 5 | Product | Tip | -z | OK | 1.00mm | OK | 1.00mm | OK | 1.18mm |
| 6 | Product | Tip | -z | NG | 1.00mm | OK | 1.00mm | NG | 4.55mm |
| 7 | Product | Tip | -z | NG | 1.00mm | OK | 1.00mm | NG | 1.25mm |
| 8 | Product | Tip | -z | NG | 1.00mm | OK | 1.00mm | NG | 1.25mm |

US 8,243,063 B2

SHAPE INSPECTION APPARATUS, SHAPE INSPECTION METHOD AND COMPUTER READABLE MEDIUM

CROSS-REFERENCE TO RELATED APPLICATIONS

This application is based on and claims priority under 35 USC 119 from Japanese Patent Application No. 2007-296350 filed Nov. 15, 2007.

BACKGROUND

1. Technical Field

The present invention relates to a shape inspection apparatus, a shape inspection method and a computer readable medium.

2. Related Art

In product design using a CAD (computer aided design) system, a determination is made as to whether or not a product shape represented as a CAD model includes an abnormal portion. When there is an abnormal portion, design of the product shape is changed. Here, the abnormal portion indicates a place where it is difficult to fabricating a mold from the CAD model or a place where a product from the mold is easily damaged. That is, the abnormal portion indicates a portion not suitable for a product, for example, such as an acute protruding portion and an acute recessed portion.

SUMMARY

According to an aspect of the invention, a shape inspection apparatus includes a shape display unit that displays a three-dimensional shape specified by three dimensional shape data on a screen; a direction designating unit that specifies a drawing direction in molding the three-dimensional shape on the screen; a face designating unit that specifies one face of a protruding or recessed shape portion of the three-dimensional shape on the screen; a dimension calculating unit that calculates a shape dimensional value of the shape portion based on the specified drawing direction and the specified one face; and a determination unit that determines whether or not the shape portion having the shape dimensional value satisfies a shape condition by comparing the calculated shape dimensional value with a standard value.

BRIEF DESCRIPTION OF THE DRAWINGS

Exemplary embodiment(s) of the present invention will be described in detail based on the following figures, wherein:

FIG. 13 is an explanatory view showing a specific example of display output of a check result in the shape inspection apparatus according to an exemplary embodiment of the invention; and FIG. 14 is an explanatory view showing a specific example of list display in the shape inspection apparatus according to an exemplary embodiment of the invention.

DETAILED DESCRIPTION

Hereinafter, a shape inspection apparatus and a shape inspection method and program thereof according to the invention will be described with reference to the accompanying drawings.

Here, it is exemplary described a determination as to whether or not a rib structure portion satisfies a shape condition. Here, the rib structure portion is a protruding shape portion in a product component having a three-dimensional shape.

Figure 1A:
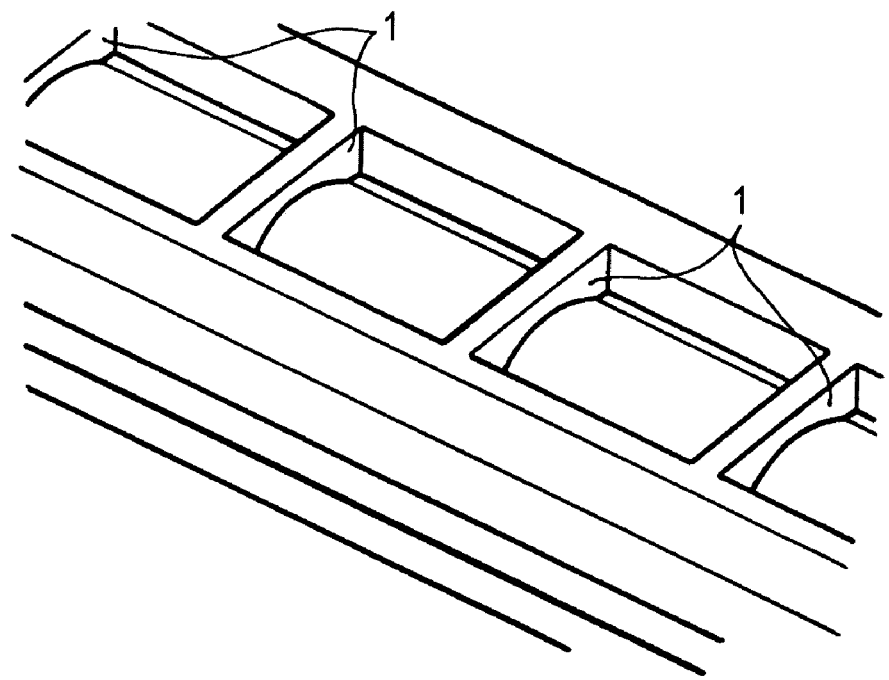
FIGS. 1A and 1B are explanatory views showing a rib structure portion which is a specific example of a shape portion to be subjected to determination processing performed by a shape inspection apparatus according to an exemplary embodiment of the invention.
Figure 1B:
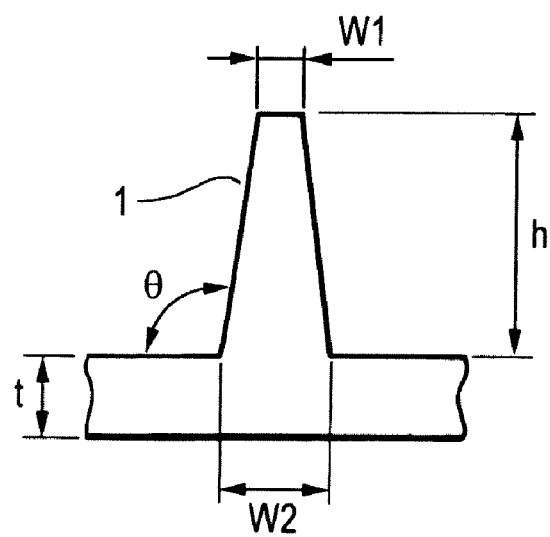

FIGS. 1A and 1B are explanatory views showing a rib structure portion which is a specific example of a shape portion to be subjected to determination processing.

As shown in FIG. 1A, a product component having a three-dimensional shape generally has a rib structure portion (hereinafter, simply referred to as a 'rib') 1, which is a protruding shape portion, to prevent deflection of the component or to secure the strength (rigidity) thereof.

However, when the rib 1 has an excessive height or thickness, there is a possibility that a so-called sink mark such as a recess or buckle will be generated on a face of the component. In addition, when the component is formed through fabricating using a mold, the shape of the rib 1 may be limited to some extent in view of fabricating a mold and molding.

Therefore, for the rib 1, it is determined whether or not the shape satisfies a shape condition in a design stage. More specifically, it is determined whether or not measurement values of height h, tip width w1, ratio w2/t of bottom width w2 and bottom wall thickness t, and gradient θ of a side face of the rib 1 shown in FIG. 1B are in an allowable range specified by standard values in the design stage.

Here, the system configuration including a shape inspection apparatus which performs determination processing on a rib will be described.

Figure 2:
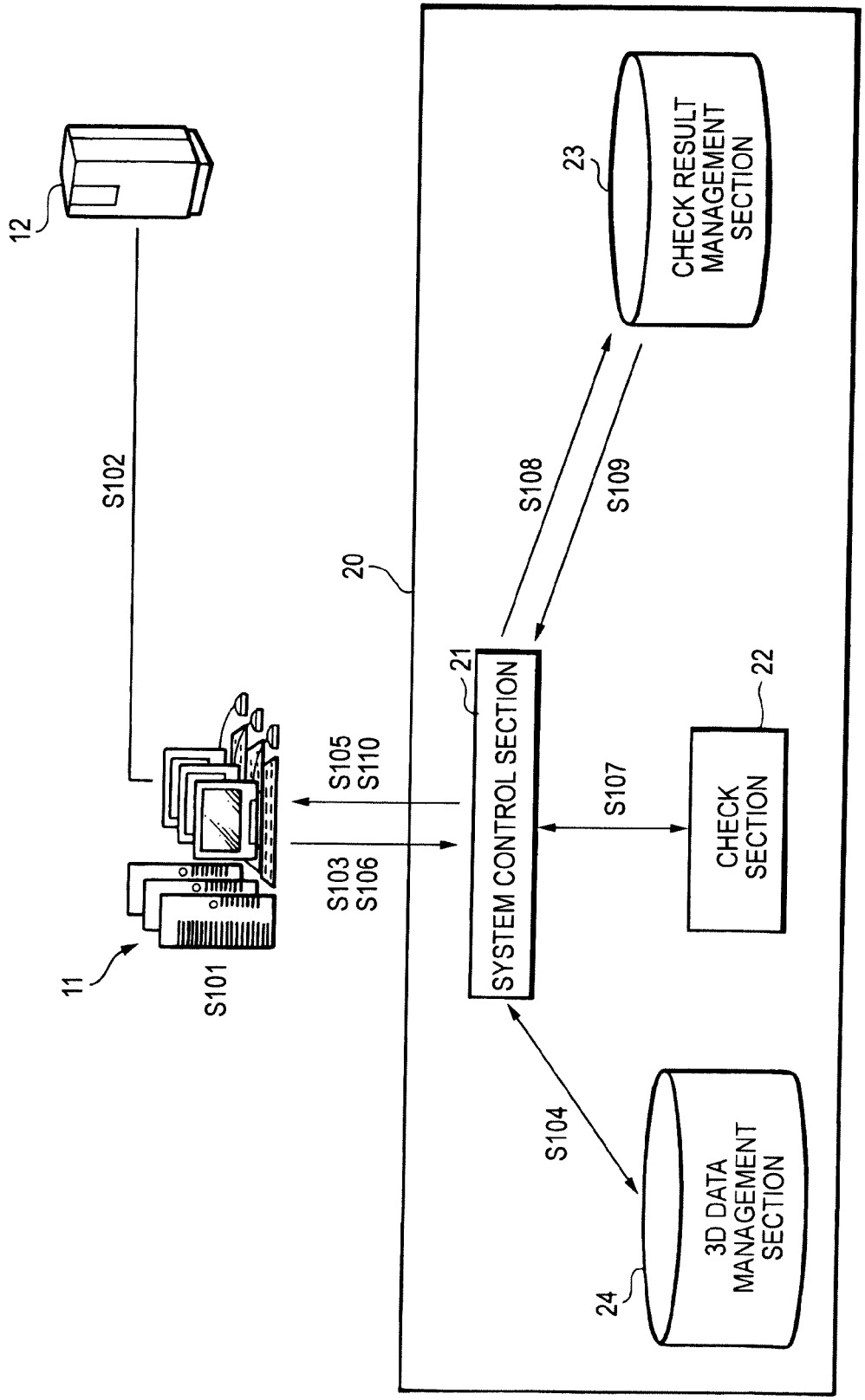
FIG. 2 is an explanatory view showing an example of a system configuration including the shape inspection apparatus according to an exemplary embodiment of the invention.

FIG. 2 is an explanatory view showing an example of a system configuration including the shape inspection apparatus according to the invention.

The system in the example shown in the drawing includes a CAD system 11 and a license server 12. The CAD system 11 includes a display device, a keyboard device, and the like provided together. The license server 12 connected to the CAD system 11 through a wired or a wireless communication line. In addition, the CAD system 11 has functions as a shape inspection apparatus 20.

The shape inspection apparatus 20 has functions as a system control section 21, a check section 22, a check result management section 23, and a three-dimensional (hereinafter, simply referred to as '3D') data management section 24. However, the shape inspection apparatus 20 may not have the 3D data management section 24 as far as the 3D data management section 24 functions on the CAD system 11.

In the system having such a configuration, a processing operation described below is performed for a determination on a rib. First, when a system user starts the CAD system 11 (step 101; hereinafter, step is simply referred to as 'S'), the CAD system 11 accesses the license server 12 to perform license authorization (S102). As a result, when the authorization is acquired, the shape inspection apparatus 20 in the CAD system 11 becomes in a state where determination processing on the rib 1 can be performed. When the system user selects and specifies a product component (hereinafter, referred to as a 'model to be checked') to be processed in this state (S103), the system control section 21 of the shape inspection apparatus 20 reads 3D data of the model to be checked which is specified from the 3D data management section 24 (S104) and displays a three-dimensional shape specified by the 3D data on the display device of the CAD system 11 (S105). Then, when the system user specifies a rib to be processed on the screen and instructs the start of determination processing on the rib (S106), the check section 22 of the shape inspection apparatus 20 performs determination processing on the rib that is specified, that is, determines whether or not the rib satisfies a shape condition (S107) and causes the check result management section 23 to store the determination result (S108). In a case where plural ribs are specified, the check result management section 23 sequentially stores determination results of each rib. Then, after the determination processing on all ribs is completed, the system control section 21 of the shape inspection apparatus 20 takes out the determination results from the check result management section 23 (S109) and causes the display device of the CAD system 11 to display the determination results (S110). Thus, the result of determination processing on the rib is provided to the system user who has requested the processing.

In the shape inspection apparatus 20 which performs a series of processing operations described above, functioning on the CAD system 11, that is, a function as a computer apparatus in the CAD system 11 is realized by executing a program. In this case, the program may be supplied in a state of being stored in a computer-readable storage medium or may be distributed through a wire or wireless communication line before the program is installed in the CAD system 11. That is, the shape inspection apparatus 20 which performs the series of processing operations described above is realized by a shape inspection program installable in the computer apparatus in the CAD system 11.

Next, a processing operation in the shape inspection apparatus (a case where a shape inspection apparatus is realized by a shape inspection program is included) 20, particularly a processing operation in a case of performing a determination on a rib will be described in more detail.

Figure 3:
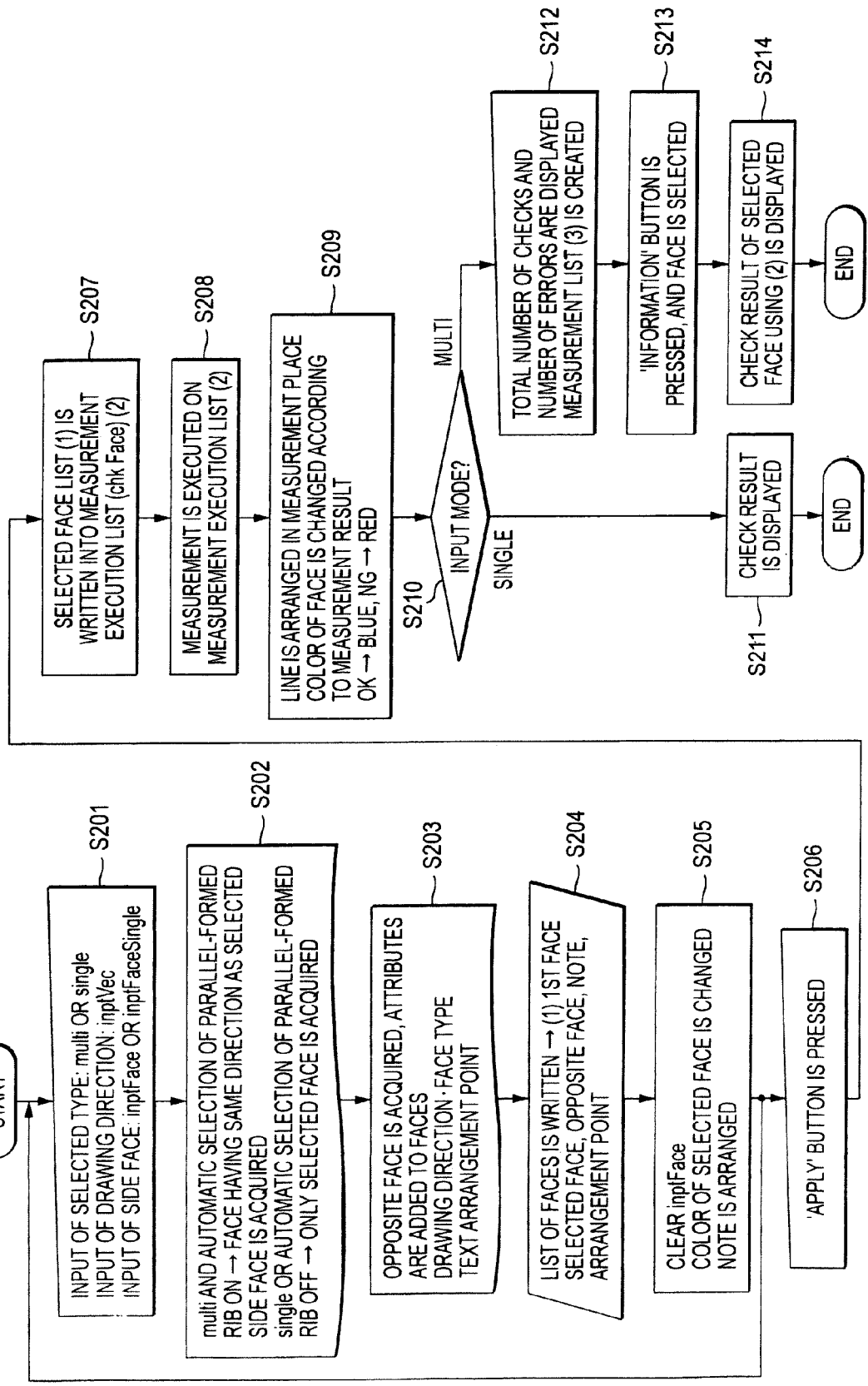
FIG. 3 is a flow chart showing an example of procedures of determination processing performed by the shape inspection apparatus according to the invention.

FIG. 3 is a flow chart showing an example of procedures of determination processing in the shape inspection apparatus 20.

As shown in the example of the drawing, when performing determination processing on a rib, the shape inspection apparatus 20 first allows a system user to perform input of a selected type, input of a drawing direction, and input of a side face (S201). The selected type indicates one of the types of determination processing between a multimode and a single mode. In the multimode, plural ribs provided in parallel are targeted to be processed. In the single mode, only one rib is targeted to be processed. The drawing direction indicates a drawing direction when molding a model to be checked which includes a rib to be processed. In addition, the side face indicates a side face which is one constituent face of the rib, for selecting and designating the rib to be processed. That is, the shape inspection apparatus 20 functions as a batch processing designating unit for designating whether or not batch processing on a plurality of ribs is to be performed, a direction designating unit for designating the drawing direction when molding a model to be checked, and a face designating unit for designating one side face of a rib to be processed on a screen displayed in the display device of the CAD system 11 through an operation of the system user.

In the case where a multimode is selected or parallel auto selection, in which plural ribs provided in parallel are automatically set as targets to be processed, is in an ON state beforehand, one side face selected on a screen of a display device and a face of constituent faces of the model to be checked having the same direction as the one side face are extracted and acquired (S202). That is, the shape inspection apparatus 20 functions as a parallel-formed portion extracting unit for extracting a shape portion having a face provided in parallel with one constituent face specified by the face designating unit when there is batch processing designation in the batch processing designating unit. On the other hand, in the case where a single mode is selected or the parallel auto selection is in an OFF state beforehand, only one side face selected on the display screen of the display device is acquired (S202).

Then, a constituent face (hereinafter, simply referred to as an 'opposite face') of the model to be checked which is positioned opposite the acquired face is acquired and an attribute is added to each face acquired, thereby specifying a drawing direction of each face, a face type (for example, a flat face or a curved face), and an arrangement point of a symbol text that makes the faces distinguishable (S203). Then, information on each face is summarized in the shape of a list and is then stored in a storage region (selected face list) (S204). Furthermore, the inside of a storage region (inptFace) which has become unnecessary by the storage is made empty, a display color of the selected face on the display screen of the display device is changed to be different from other portions, and a symbol text is disposed and displayed as a note (S205) such that the system user can identify the face.

Then, when the system user presses (clicks) an "apply" button for instructing the start of execution of determination processing (S206), the shape inspection apparatus 20 starts the determination processing on a rib having the face selected. Specifically, first, information on one rib among stored information in the selected face list is written into another storage region (measurement execution list) (S207), and shape measurement of the one rib is performed based on the written information (S208). That is, the shape inspection apparatus 20 functions as a dimension calculating unit for calculating shape dimensional values of the height h, tip width w1, ratio w2/t of bottom width w2 and bottom wall thickness t, and gradient θ of a side face of the one rib. In addition, after the shape dimensional values are calculated, the calculation results are compared with standard values in order to determine whether or not the shape dimensional values are in an allowable range specified by the standard values. That is, the shape inspection apparatus 20 functions as a determination unit for determining whether or not a rib having each shape dimensional value calculated satisfies a shape condition specified by the standard values. Furthermore, in the case when information on a plurality of ribs is stored in the selected face list, a determination on one rib is completed and then a determination on a next rib is started, and this is repeated until determinations on all ribs are completed.

Regarding a determination result obtained as described above, display colors of faces are differently displayed on the screen of the display device, for example, a blue color is displayed when the determination result satisfies a shape condition (in the case of OK) and a red color is displayed when the determination result does not satisfy the shape condition (in the case of NG) such that the system user can recognize the determination result (S209). That is, the shape inspection apparatus 20 functions as a determination result display unit for displaying a rib, which is determined not to satisfy the shape condition, in a state where the rib can be distinguished from another shape portion of a model to be checked.

After performing the series of determination processing described above, a detailed result (hereinafter, simply referred to as a 'check result') of the determination processing regarding the rib having the selected one side face is displayed on the display device (S211) in the case where the single mode is selected (S210). However, in the case where the multimode is selected, all check results on the plural ribs are not displayed but the total number of checks (total number of ribs which have been subjected to determination processing), the number of errors (the number of ribs determined not to satisfy the shape condition), and the like is displayed as a list on the display device (S212). Then, when an 'information' button for requesting more detailed display is pressed (clicked) and a face is selected to be displayed (S213), the display device displays the check result regarding the rib having the selected face (S214).

Here, each step in the series of processing operations will be described in more detail using a specific example.

First, a step (S201 in FIG. 3) in which the drawing direction input and the side face input are performed will be described in detail.

Figure 4A:
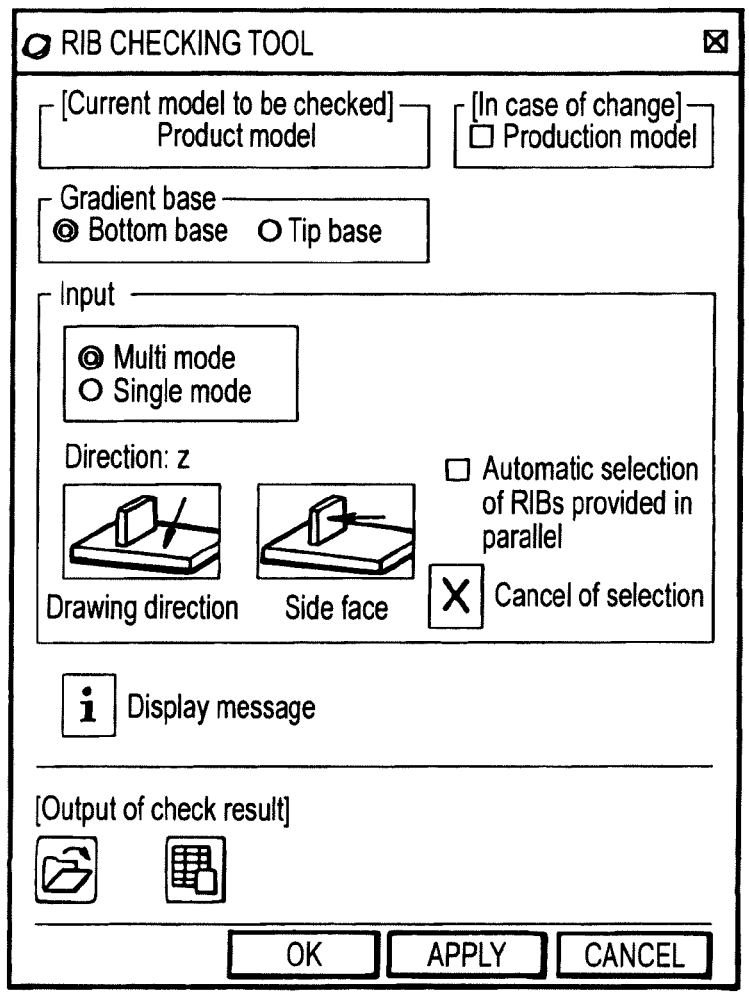
FIGS. 4A and 4B are explanatory views showing a specific example of an operation of drawing direction input and side face input in the shape inspection apparatus according to an exemplary embodiment of the invention.
Figure 4B:
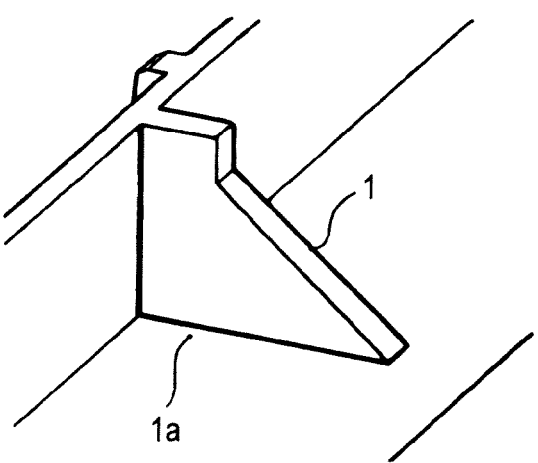

FIGS. 4A and 4B are explanatory views showing a specific example of an input operation of drawing direction and side face.

As already described, the shape inspection apparatus 20 reads 3D data of a model to be checked after the CAD system 11 is started, and makes a three-dimensional shape specified by the 3D data screen-displayed on the display device.

When the system user selects and presses a rib check button for performing determination processing on a rib from a menu in this state, the shape inspection apparatus 20 makes a window screen shown in FIG. 4A displayed on the display device in order to allow the system user to input drawing direction. Specifically, the shape inspection apparatus 20 allows the system user to specify a vector indicating the drawing direction using the window screen. In addition, it may be considered that the vector designation is performed by using a known technique of extracting a normal vector of a selected face or extracting a vector component by connecting selected two points.

Moreover, the shape inspection apparatus 20 allows the system user to input the side face regarding the rib 1 to be processed as shown in FIG. 4B. Specifically, it may be considered that one side face 1a is specified through a procedure of performing clicking in a state where a cursor is positioned at the one side face 1a in the rib 1 to be processed of the model to be checked, which is displayed.

Subsequently, a step (S202 in FIG. 3) in which a face having the same direction as the selected one side face is automatically extracted will be described in detail.

Figure 5:
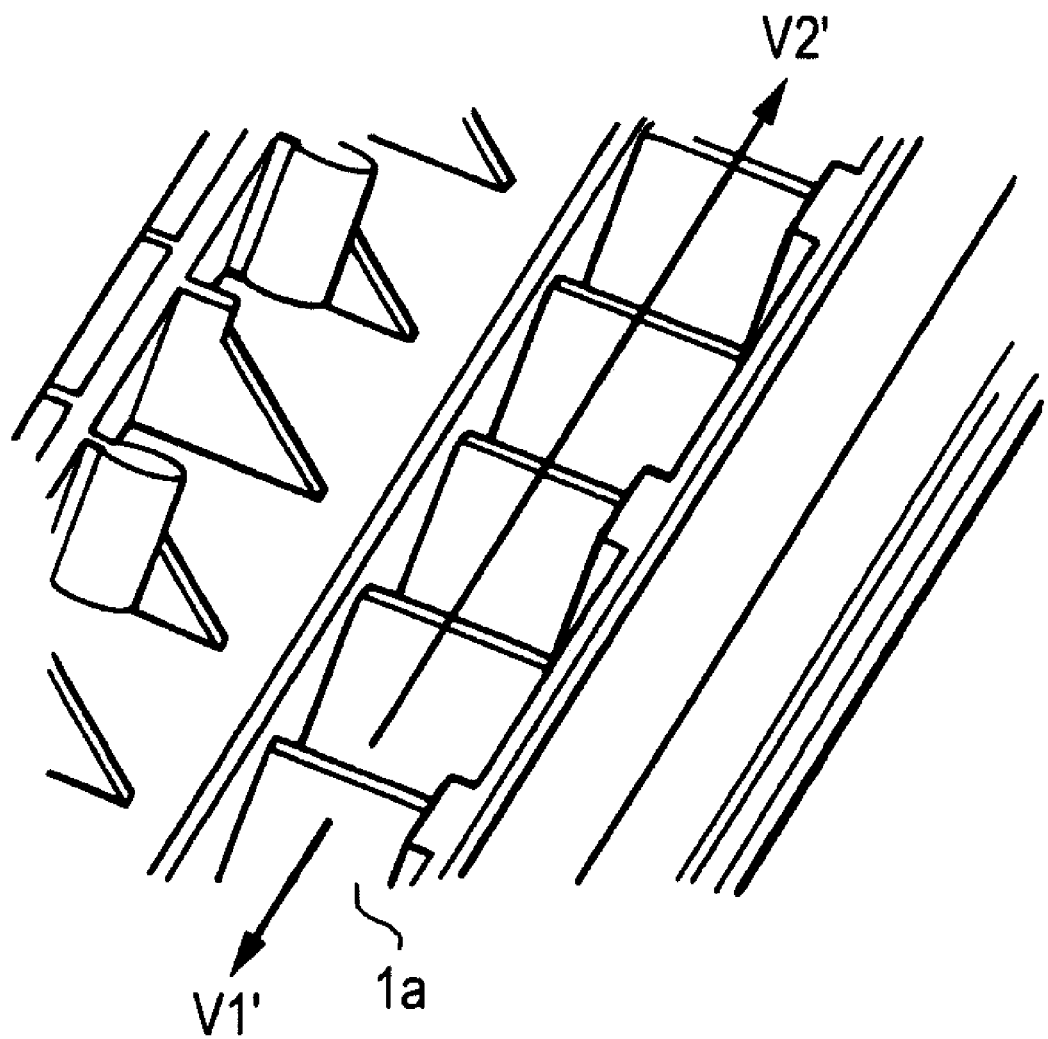
FIG. 5 is an explanatory view showing a specific example of automatic face extraction in the shape inspection apparatus according to an exemplary embodiment of the invention.

FIG. 5 is an explanatory view showing a specific example of automatic face extraction.

In case of performing the automatic face extraction, when the one side face 1a that forms a rib is selected through the input like the example shown in the drawing, the shape inspection apparatus 20 calculates a correction normal vector V1' in the one side face 1a. The correction normal vector V1' is obtained by performing angle correction on a normal vector of the one side face 1a and is a vector extending in a direction perpendicular to a vector specified by the drawing direction input. Details of the angle correction will be described later. After calculating the correction normal vector V1', the shape inspection apparatus 20 calculates a minus vector V2' whose direction is opposite to the direction of the correction normal vector V1'. Then, after calculating the vectors V1' and V2', the shape inspection apparatus 20 irradiates an imaginary projection beam along the vectors V1' and V2' (i) from a selected point (clicking place) when the one side face 1a is selected or (ii) from an entire face region of the one side face 1a. Thus, the shape inspection apparatus 20 extracts and acquires faces as provided in parallel with the one side face 1a among faces forming the model to be checked. These faces have the same direction as the one side face 1a (face where the direction of the vector V1' is an external side) and a projection beam crosses these faces. Furthermore, opposite faces (face where the direction of the vector V2' is an external side) positioned opposite the acquired respective parallel-formed faces is recognized. A distance between the parallel-formed face and the corresponding opposite face is calculated. And when a calculation result is equal to or smaller than a predetermined width, a rib is extracted and acquired in parallel with the rib having the one side face 1a. When the distance between the faces is larger than the predetermined width, the distance is not recognized as a rib to exclude forms other than a rib in an extraction and acquisition result.

By performing the processing operations described above, once the one side face 1a forming a rib is selected, the shape inspection apparatus 20 extracts all ribs which have faces in parallel with the one side face 1a, as ribs provided in parallel with the rib.

Then, a step (S208 in FIG. 3) of measuring the shape of a rib, that is, a step of calculating a shape dimensional value of the rib will be described in detail. The step of calculating shape dimensional values includes a step of calculating the height h, a step of calculating the tip width w1, a step of calculating the bottom width w2, a step of calculating the bottom wall thickness t, a step of calculating the ratio w2/t of the bottom width w2 and the bottom wall thickness t, a step of calculating the gradient θ, and a step of performing angle correction in a direction of a normal line of a rib side face.

FIGS. 6A to 6D are explanatory views showing a specific example of calculating the height h.

Figure 6A:
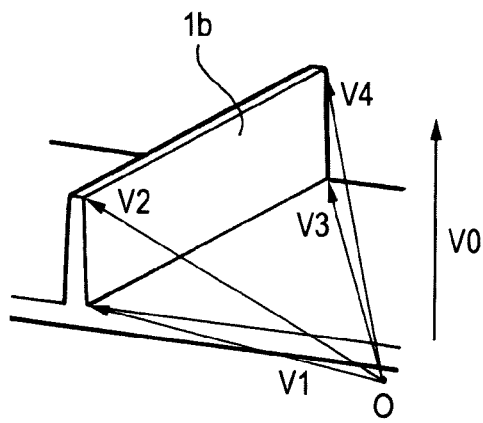
FIGS. 6A, 6B, 6C and 6D are explanatory views showing a specific example of calculating the height of a rib in the shape inspection apparatus according to an exemplary embodiment of the invention.

In calculating the height h of a rib, the shape inspection apparatus 20 first performs recognition of upper and lower end points as shown in FIG. 6A. That is, the shape inspection apparatus 20 acquires all edges (all lines that form the edge of a selected face 1b) of the selected face (one side face selected by side face input or a parallel-formed face extracted and acquired by automatic face extraction) 1b that forms a rib and further acquires all end points of each edge. In addition, vectors V1 to V4 extending from an arbitrary point (for example, coordinate origin O) in a coordinate space where a model to be checked exists toward the end points are generated and a value of an inner product between each of the vectors V1 to V4 and the drawing direction vector V0 specified by drawing direction input is calculated. At this time, the value of the inner product increases as the directions of the vectors are close to each other. And the value of the inner product decreases as the directions of the vectors are far from each other. Accordingly, the shape inspection apparatus 20 sets an end point as an upper end point of the selected face 1b where a value of an inner product between the vector joining the arbitrary point to the end point and the drawing direction vector V0 is a maximum. And the shape inspection apparatus 20 sets an end point as a lower end point of the selected face 1b where a value of an inner product between the vector joining the arbitrary point to the end point and the drawing direction vector V0 is a minimum.

Figure 6B:
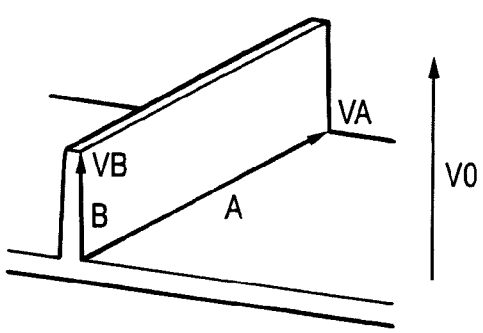

After recognizing the upper and lower end points of the selected face 1b, the shape inspection apparatus 20 performs recognition of upper and lower end edges as shown in FIG. 6B. That is, in the case of a lower end edge, for example, the shape inspection apparatus 20 recognizes all edges A and B on the selected face 1b abutting on a lower end point, creates vectors VA and VB along the edges A and B from the lower end point, and calculates a value of an inner product between each of the vectors VA and VB and the drawing direction vector V0 specified by the drawing direction input. In addition, an edge corresponding to a smaller inner product value is set to the lower end edge. The upper end edge may be specified by the same processing. In the case of the upper end edge, however, an edge corresponding to a condition where a value of an inner product between the edge and the vector V0 is larger is set to the upper end edge.

Figure 6C:
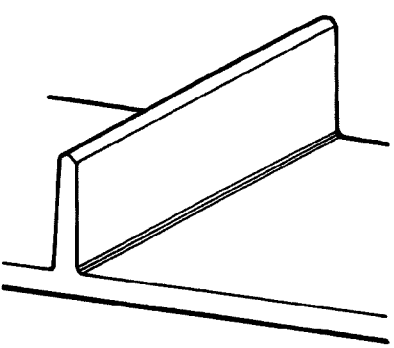

In addition, as shown in FIG. 6C, there is a rib having fillet (rib having a curved end shape). For such a rib, it is considered to recognize the upper and lower end edges in a state where a face forming the curved face portion is included by acquiring a face (face which forms a curved face portion) abutting on the upper and lower end edges recognized by the above procedures, recognizing and acquiring all edges of the face are, and then repeating the recognition of upper and lower end points and the recognition of upper and lower end edges in a state where all the edges are included.

Figure 6D:
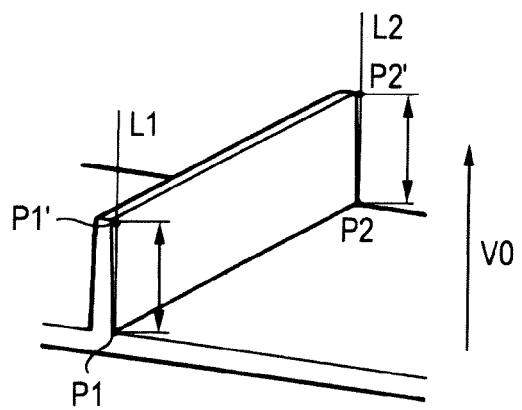

After recognizing the upper and lower end edges of the selected face 1b as described above, the shape inspection apparatus 20 performs recognition of the rib height as shown in FIG. 6D. That is, the shape inspection apparatus 20 creates straight lines L1 and L2 extending from both end points P1 and P2 of the lower end edge toward a direction along the drawing direction vector V0 specified by the drawing direction input and measures a distance between each of the straight lines L1 and L2 and the upper end edge. More specifically, a shortest distance between a point on each of the straight lines L1 and L2 and a point on the upper end edge is measured. Then, distances between points P1' and P2' on the straight lines L1 and L2 created as measurement points at that time and the both end points P1 and P2 of the lower end edge are measured, and a larger one of the distances P1-P1' and P2-P2' is calculated as the height h of the rib.

FIGS. 7A to 7D are explanatory views showing a specific example of calculating the tip width w1.

Figure 7A:
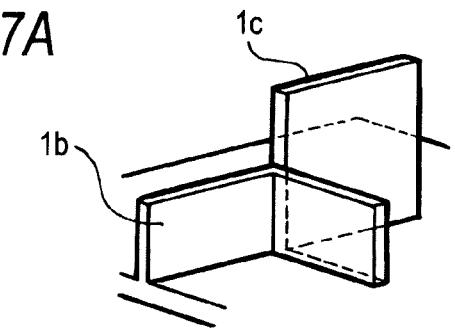
FIGS. 7A, 7B, 7C and 7D are explanatory views showing a specific example of calculating the tip width in the shape inspection apparatus according to an exemplary embodiment of the invention.
Figure 7B:
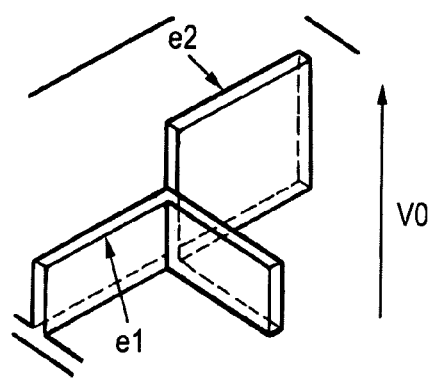

In calculating the tip width w1, the shape inspection apparatus 20 first recognizes a selected face 1b which forms a rib and an opposite face 1c which is another face forming the rib and is positioned opposite the selected face 1b, as shown in FIG. 7A. Then, as shown in FIG. 7B, upper end edges e1 and e2 of the faces 1b and 1c are recognized. Recognition of the upper end edges e1 and e2 may be performed in the same manner as the case of calculation of the rib height h (refer to FIG. 6B).

Figure 7C:
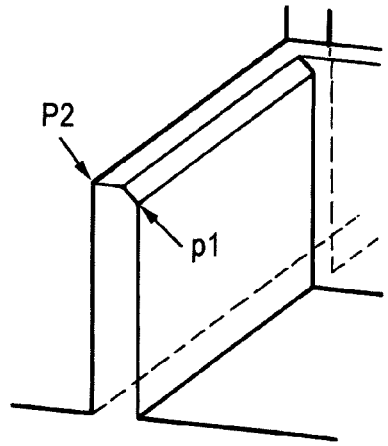

After recognizing the upper end edges e1 and e2, the shape inspection apparatus 20 measures distances between the upper end edges e1 and e2 and all edges of the opposite faces by round-robin processing. That is, for the upper end edge e1, a shortest distance between a point on the upper end edge e1 and a point on all edges of the opposite face 1c, which is an opposite face of the selected face 1b including the upper end edge e1, is measured. In addition, for the upper end edge e2, a shortest distance between a point on the upper end edge e2 and a point on all edges of the opposite face 1b, which is an opposite face of the selected face 1c including the upper end edge e2, is measured. Then, a value (value of a smaller one in the case when results of distance measurement regarding the upper end edge e1 and e2 are different) of the shortest distance obtained as described above and the points P1 and P2 created as measurement points at that time shown in FIG. 7C are acquired, and the position of each of the points P1 and P2 is calculated as a calculation position of the tip width w1 using the acquired distance value as the tip width w1.

Figure 7D:
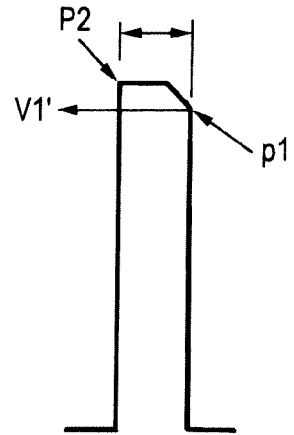

However, in the case where a rib has fillet or chamfering is executed on the edge of a rib as shown in FIG. 7D, for example, there is a possibility that a shortest distance value of a line that connects the points P1 and P2 will not be necessarily equal to the value of the tip width w1. Therefore, the shape inspection apparatus 20 acquires a correction normal vector V1', which will be described later, and calculates a distance from either the point P1 or the point P2 to an opposite face in a direction along the correction normal vector V1' when the correction normal vector V1' does not match the direction of the line that connects the points P1 and P2. Such calculation may be performed using a known concept, such as theorem of three squares. In addition, the distance value acquired as described above is set as a calculation value of the tip width w1.

Figure 8A:
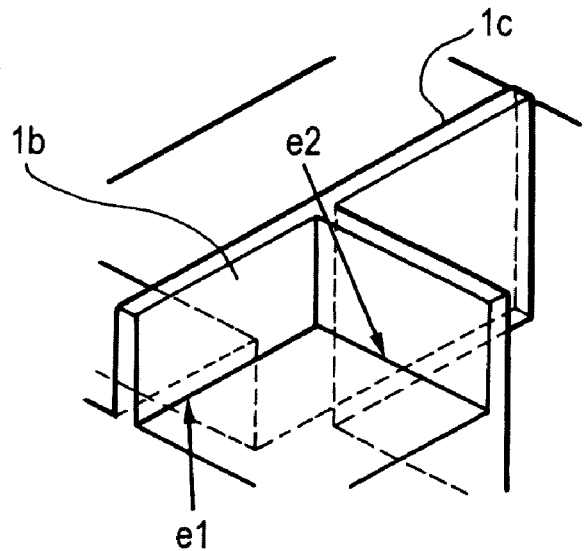
FIGS. 8A, 8B and 8C are explanatory views showing a specific example of calculating the bottom width in the shape inspection apparatus according to an exemplary embodiment of the invention.
Figure 8B:
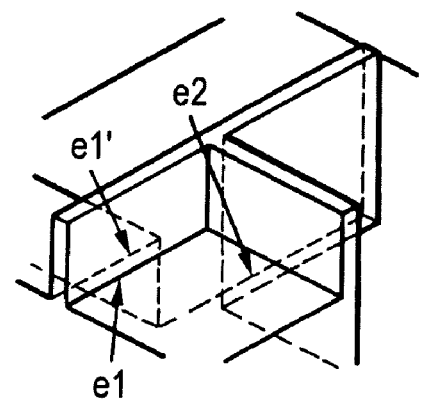
Figure 8C:
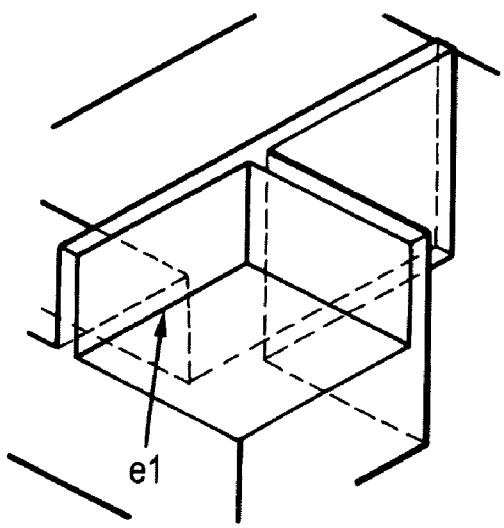

FIGS. 8A to 8C are explanatory views showing a specific example of calculating the bottom width w2.

In calculating the bottom width w2, the shape inspection apparatus 20 first recognizes a selected face 1b which forms a rib and an opposite face 1c which is another face forming the rib and is positioned opposite the selected face 1b, as shown in FIG. 8A. Then, lower end edges e1 and e2 of the faces 1b and 1c are recognized. Recognition of the lower end edges e1 and e2 may be performed in the same manner as the case of calculation of the rib height h (refer to FIG. 6B).

After recognizing the lower end edges e1 and e2, the shape inspection apparatus 20 measures distances between the lower end edges e1 and e2 and all edges of the opposite faces by round-robin processing, as shown in FIG. 8B. That is, for the lower end edge e1, a shortest distance between a point on the lower end edge e1 and a point on all edges of the opposite face 1c, which is an opposite face of the selected face 1b including the lower end edge e1, is measured. In addition, for the lower end edge e2, a shortest distance between a point on the lower end edge e2 and a point on all edges of the opposite face 1b, which is an opposite face of the selected face 1c including the lower end edge e2, is measured. Then, the other edge e1' by which the shortest distance is obtained is acquired from the measurement result, and the other edge e1' acquired is specified as a measurement edge used in calculation of the bottom width w2.

Then, as shown in FIG. 8C, the shape inspection apparatus 20 recognizes edge lengths of the measurement edge e1' and lower end edge e1 which is the other side in the measurement of a shortest distance, compares the edge lengths, and specifies the edge (measurement edge e1' in the case shown in the drawing) having a smaller edge length. Then, a starting point, a middle point, and an end point on the specified measurement edge e1' are extracted, these points are acquired as measurement points used for calculation of the bottom width w2, a distance between each of the measurement points and the lower end edge e1 which is the other party is measured, and a largest value of the distances is calculated as the bottom width w2.

Figure 9:
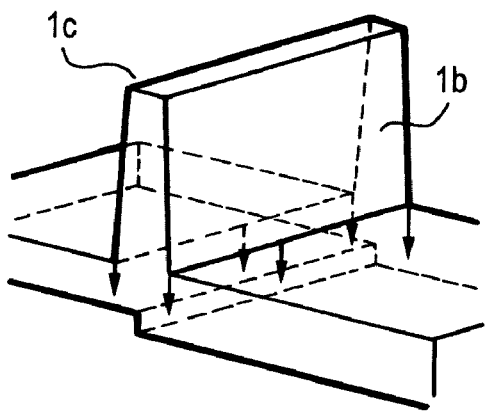
FIG. 9 is an explanatory view showing a specific example of calculating the bottom wall thickness in the shape inspection apparatus according to an exemplary embodiment of the invention.

FIG. 9 is an explanatory view showing a specific example of calculating the bottom wall thickness t.

In calculating the bottom wall thickness t, the shape inspection apparatus 20 first performs recognition of the lower end edges e1 and e2 of the selected face 1b forming a rib and the opposite face 1c similar to calculation of the bottom width w2. Then, a starting point, a middle point, and an end point on each of both the lower end edges e1 and e2 are extracted and are acquired as measurement points used for calculation of the bottom wall thickness t.

After acquiring the measurement points, the shape inspection apparatus 20 irradiates an imaginary projection beam from each measurement point toward a direction opposite the direction of the drawing direction vector V0 specified by the drawing direction input, as shown in FIG. 9 (refer to arrow in the drawing). In addition, a constituent face of a model to be checked that is first hit by each projection beam is extracted and acquired.

Thereafter, a distance between each constituent face acquired as described above and each of the lower end edges e1 and e2 is measured by round-robin processing. Then, a smallest one of the distance values which are measurement results is calculated as the bottom wall thickness t serving as a base in a rib having the selected face 1b. The reason why the smallest distance value is set as the bottom wall thickness t is based on so-called worst case design.

Calculation of the ratio w2/t of the bottom width w2 and the bottom wall thickness t is preferably performed by dividing the bottom width w2 calculated in the procedure described above by the bottom wall thickness t calculated in the same procedure as described above.

Figure 10:
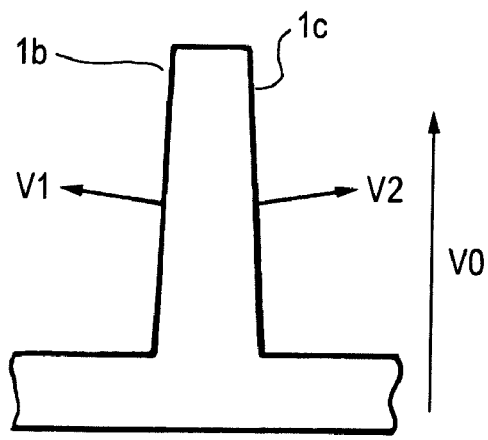
FIG. 10 is an explanatory view showing a specific example of calculating the gradient in the shape inspection apparatus according to an exemplary embodiment of the invention.

FIG. 10 is an explanatory view showing a specific example of calculating the gradient θ.

In calculating the gradient θ, the shape inspection apparatus 20 first recognizes a selected face 1b which forms a rib and an opposite face 1c which is another face forming the rib and is positioned opposite the selected face 1b. Then, normal vectors V1 and V2 of the faces 1b and 1c are acquired.

After acquiring the normal vectors V1 and V2, the shape inspection apparatus 20 calculates a value of an inner product between each of the normal vectors V1 and V2 and the drawing direction vector V0 specified by the drawing direction input. Then, an inclination angle of each of the selected face 1b and the opposite face 1c with respect to the direction of the drawing direction vector V0 is calculated from a result of calculation of each inner product value, and the gradient θ regarding each of the faces 1b and 1c is specified based on the calculation result.

Figure 11:
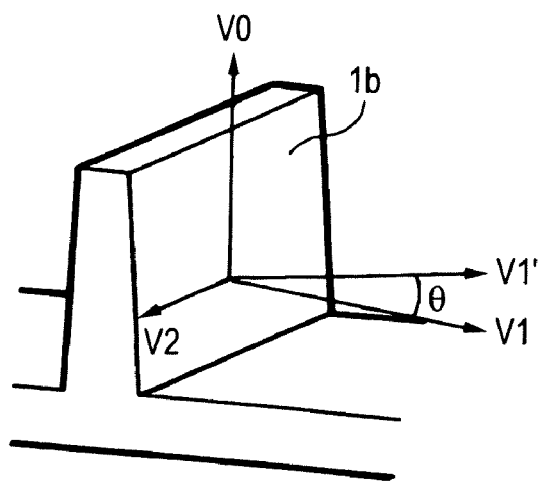
FIG. 11 is an explanatory view showing a specific example of angle correction in a direction of a normal line of a rib side face in the shape inspection apparatus according to an exemplary embodiment of the invention.

FIG. 11 is an explanatory view showing a specific example of angle correction in a direction of a normal line of a rib side face.

For example, in the case where the gradient θ is given to the side face that forms the rib, the relationship between the normal vector V1 on the side face and the drawing direction vector V0 specified by the drawing direction input is not necessarily unique. Therefore, in the step of performing the automatic face extraction for batch processing described above or the step of calculating the tip width w1 of a rib, a problem may occur if the normal vector V1 is used.

For this reason, the shape inspection apparatus 20 performs angle correction on the normal vector V1 on the side face when the gradient θ is given to the side face that forms the rib. Specifically, as shown in FIG. 11, the shape inspection apparatus 20 acquires the normal vector V1 on the selected face 1b that forms the rib, calculates a value of an inner product between the normal vector V1 and the drawing direction vector V0 specified by the drawing direction input, and recognizes the gradient θ on the selected face 1b from the calculation result. Furthermore, a value of an outer product between the normal vector V1 and the drawing direction vector V0 is calculated, and a vector V2 extending in a direction perpendicular to the vectors V1 and V0 is calculated from the calculation result. After the vector V2 is calculated, a correction normal vector V1' obtained by performing angle correction on the vector V1 is acquired by rotating the vector V1 by the gradient θ using the vector V2 as a reference axis, that is, a rotation center.

Since the angle correction is performed by the gradient θ on the correction normal vector V1', the correction normal vector V1' is in a unique state where the relationship between the correction normal vector V1' and the drawing direction vector V0 is always orthogonal.

By performing each step of the algorithm described above, the shape inspection apparatus 20 calculates measurement values of the height h, tip width w1, ratio w2/t of bottom width w2 and bottom wall thickness t, and gradient θ of a side face of a rib as shape dimensional values of the rib on the basis of the drawing direction vector V0 specified by the drawing direction input and the selected face 1b which is selected by the side face input or is collectively extracted as a parallel-formed face.

After the shape dimensional values of the rib are calculated in the step of the algorithm described above, the shape inspection apparatus 20 compares the calculated shape dimensional values with standard values and determines the shape dimensional values are in an allowable range specified by standard values. Specifically, it is determined whether or not a result of calculation of the height h exceeds a standard value of the height h, whether or not a result of calculation of the tip width w1 exceeds a standard value of the tip width w1, whether or not the ratio w2/t of the bottom width w2 and the bottom wall thickness t exceeds a standard value of the ratio w2/t, and whether or not the gradient θ falls within an allowable range specified by a standard value of the gradient θ. When all of the above conditions are satisfied, it is determined that the rib having those shape dimensional values satisfies a shape condition. In addition, it is preferable that the standard values be set beforehand for each item of the height h, the tip width w1, the ratio w2/t, and the gradient θ, and the standard values are not particularly limited.

Next, a step (S209 to S214 in FIG. 3) of outputting a result of determination processing on a rib to a system user through screen display will be described in detail.

Figure 12:
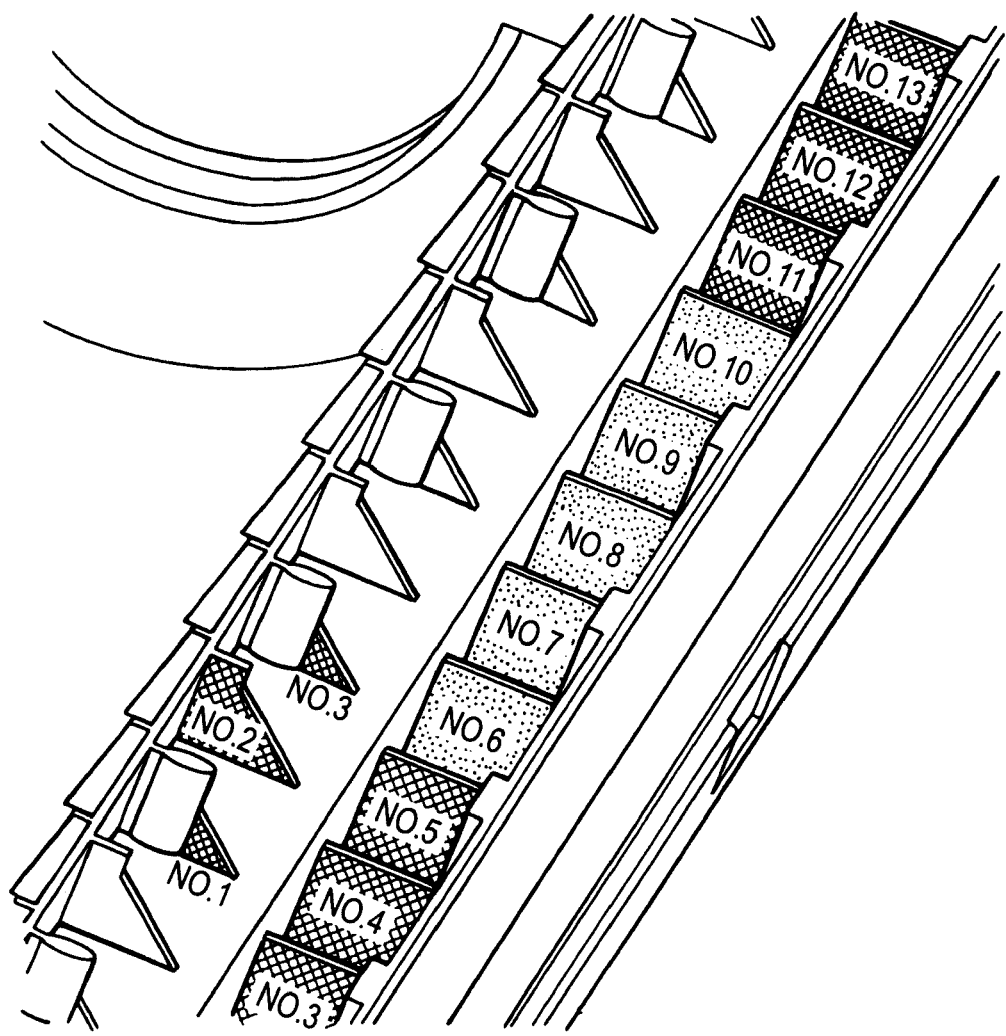
FIG. 12 is an explanatory view showing a specific example of screen display output in the shape inspection apparatus according to an exemplary embodiment of the invention.

FIG. 12 is an explanatory view showing a specific example of screen display output.

After completing the determination processing on all ribs to be processed, the shape inspection apparatus 20 performs screen display of a rib, which is determined not to satisfy the shape condition as a result of the determination processing, in a state where the rib can be distinguished from the other portions of the model to be checked (refer to S209 in FIG. 3). Specifically, as shown in the example of the drawing, display colors are differently displayed on the display screen of the display device, for example, a blue color is displayed for a rib that satisfies the shape condition regarding all items of the height h, the tip width w1, the ratio w2/t, and the gradient θ and a red color is displayed for a rib that does not satisfy the shape condition regarding any one of the items such that the system user can recognize the situation. In addition, although the display color of a rib is not particularly limited, the display color is set differently from portions other than the rib. This is to make a rib to be processed distinguishable from portions other than the rib. Furthermore, for all ribs to be processed regardless of whether or not the ribs satisfy the shape condition, unique symbol text is disposed and displayed on arrangement points so that each rib can be identified by the symbol text.

After such screen display output is performed, the shape inspection apparatus 20 outputs a check result, which is a detailed result of the determination processing, through screen display (refer to S211 or S214 in FIG. 3).

FIG. 13 is an explanatory view showing a specific example of display output of a check result.

In display output of the check result, the shape inspection apparatus 20 displays a window screen, which is shown in the example of the drawing, on the display device. That is, a result of determination on each shape dimensional value of a rib, a standard value serving as a reference of the determination, and the like are displayed on the window screen.

However, in the case where the multimode is selected, all check results on plural ribs are not displayed immediately after results of determination on the plural ribs are obtained but the total number of checks, the number of errors, and the like are firstly displayed as a list format on the display device due to limitation in the screen size of the display device (refer to S212 in FIG. 3).

FIG. 14 is an explanatory view showing a specific example of list display.

As shown in the example of the drawing, when the multimode is selected, the shape inspection apparatus 20 displays a window screen, which shows details of check on each rib in a list format, on the display device in such a manner that a symbol text given to each rib serves as an identifier. Then, when the system user selects and specifies a symbol text, that is, the system user specifies a rib (face) to request more detailed display on the window screen in the list format, the shape inspection apparatus 20 performs display output of a check result on the rib selected after the 'information' button is pressed.

By performing the series of processing operations described above, the shape inspection apparatus 20 calculates the shape dimensional values of a rib (including parallel-formed ribs in the case of the multimode) related to designation from the drawing direction of a model to be checked, which has been specified by the system user, and one side face of the rib, which is to be subjected to determination processing, of the model to be checked on the CAD system 11, determines whether or not the rib satisfies the shape condition, and outputs the determination result through the screen display. That is, the system user can obtain a result of determination on whether or not the rib related to the designation satisfies the shape condition by designating the drawing direction and one constituent face.

In addition, although specific examples of the invention have been described in the present exemplary embodiment, the invention is not limited thereto.

For example, in the present exemplary embodiment, a case where a result of determination processing on a rib is displayed and output on a screen of a display device has been mentioned as an example. However, the output destination is not limited thereto, but it may be considered to output the result to a storage device in a file format to store the result in the storage device or to transmit the result to an external device, which is connected through a communication line, and to make the external device execute processing, such as output of the result.

Furthermore, in the present exemplary embodiment, a case where a system user specifies one side face that forms a rib in selecting and designating the rib has been mentioned as an example. However, also for a face other than the one side face, the shape dimensional value of the rib may be calculated as long as the face is one constituent face of the rib.

Furthermore, in the present exemplary embodiment, a case where a protruding rib formed in a model to be checked is set as an object to be subjected to determination processing has been mentioned as an example. However, for example, also for a protruding shape portion other than a rib or a recessed shape portion, such as a groove or a slit, a determination on whether or not the shape portion satisfies a condition when the shape portion is formed by die making, molding, and the like can be made by applying the invention.

Thus, the invention is not limited to the above-described exemplary embodiment, but various modifications may be made within the scope without departing from the subject matter or spirit of the invention.

What is claimed is:

1. A shape inspection apparatus comprising:
    a shape display unit that displays a three-dimensional shape specified by three dimensional shape data on a screen;
    a direction designating unit that specifies a drawing direction in molding the three-dimensional shape on the screen;
    a face designating unit that specifies on the screen one face of a rib being a protruding shape portion of the three-dimensional shape;
    a dimension calculating unit that calculates shape dimensional values of a height of the rib, a tip width of the rib, a ratio of a bottom width and a bottom wall thickness of the rib and a gradient of a side face of the rib on the basis of the specified drawing direction and coordinates of the specified one face; and
    a determination unit that determines whether or not the shape portion having the shape dimensional values satisfy shape conditions by comparing the calculated shape dimensional values with standard values.

2. The shape inspection apparatus according to claim 1, further comprising:
    a determination result display unit that displays the shape portion, which is determined not to satisfy the shape condition by the determination unit, in a state where the shape portion is distinguishable from another shape portion of the three-dimensional shape.

3. The shape inspection apparatus according to claim 1, wherein the one face is one side face of the shape portion.

4. A shape inspection apparatus comprising:
a shape display unit that displays a three-dimensional shape specified by three dimensional shape data on a screen;
a direction designating unit that specifies a drawing direction in molding the three-dimensional shape on the screen;
a face designating unit that specifies one face of a protruding or recessed shape portion of the three-dimensional shape on the screen;
a dimension calculating unit that calculates a shape dimensional value of the shape ortion based on the s ecified drawin direction and the s ecified one face;
a determination unit that determines whether or not the shape portion having the shape dimensional value satisfies a shape condition by comparing the calculated shape dimensional value with a standard value;
a batch processing designating unit that specifies batch processing on a plurality of shape portions; and
a parallel-formed portion extracting unit that, when the batch processing is specified by the batch processing designating unit, extracts another shape portion having a face provided in parallel with the specified one face,
wherein the dimension calculating unit calculates as to the shape portion extracted by the parallel-formed portion extracting unit, and
the determination unit that determines as to the shape portion extracted by the parallel-formed portion extracting unit.

5. A shape inspection method comprising:
displaying three dimensional shape specified by a three-dimensional shape data on a screen;
specifying a drawing direction in molding the three-dimensional shape on the screen;
specifying on the screen one face of a rib being a protruding shape portion of the three-dimensional shape;
calculating a shape dimensional values of a height of the rib, a tip width of the rib, a ratio of a bottom width and a bottom wall thickness of the rib and a gradient of a side face of the rib on the basis of the shape portion based on the specified drawing direction and coordinates of the specified one face; and
determining whether or not the shape portion having the shape dimensional values satisfy shape conditions by comparing the calculated shape dimensional values with standard values.

6. A non-transitory computer readable medium storing a program causing a computer to execute a process for shape inspection, the process comprising:
displaying three dimensional shape data of a three-dimensional shape on a screen;
specifying a drawing direction in molding the three-dimensional shape on the screen;
specifying on the screen one face of a rib being a protruding shape portion of the three-dimensional shape;
calculating a shape dimensional values of a height of the rib, a tip width of the rib, a ratio of a bottom width and a bottom wall thickness of the rib and a gradient of a side face of the rib on the basis of the shape portion based on the specified drawing direction and coordinates of the specified one face; and
determining whether or not the shape portion having the shape dimensional values satisfy shape conditions by comparing the calculated shape dimensional values with standard values.

* * * * *